Jan. 7, 1936.  W. H. HARDING ET AL  2,027,166
ROSIN SIZING AND METHOD OF MAKING THE SAME
Filed Oct. 24, 1930
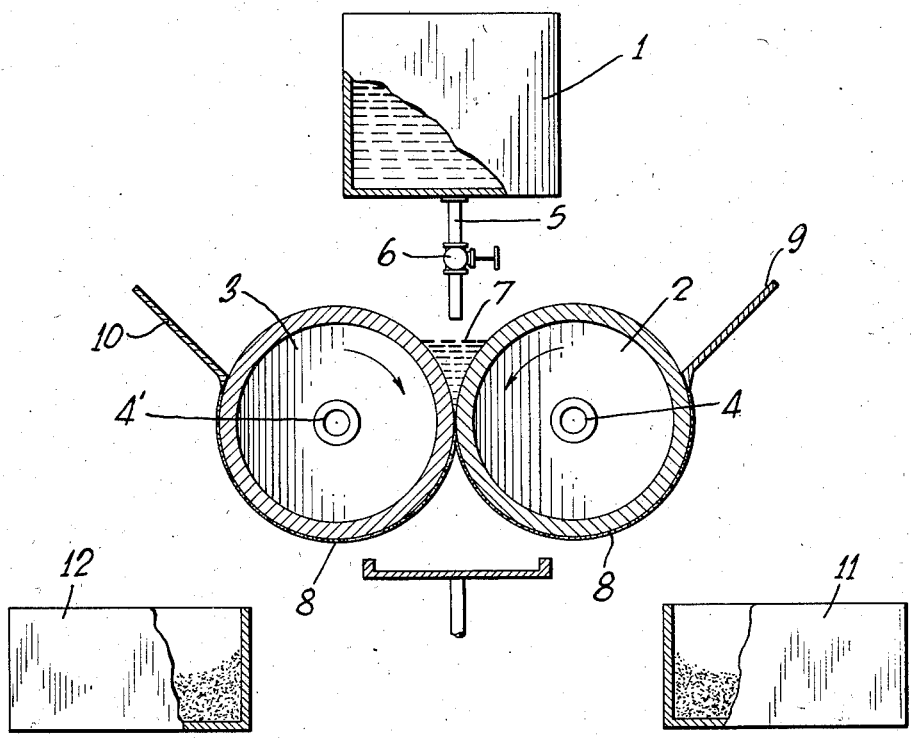
William H Harding
and
Albert W Montgomery
BY their ATTORNEYS
INVENTORS

Patented Jan. 7, 1936

UNITED STATES PATENT OFFICE 2,027,166

ROSIN SIZING AND METHOD OF MAKING THE SAME

William H. Harding, Flushing, N. Y., and Albert W. Montgomery, Cedartown, Ga., assignors to American Cyanamid & Chemical Corporation, New York, N. Y., a corporation of Delaware Application October 24, 1930, Serial No. 490,854

10 Claims. (Cl. 134—21)

Our invention relates to a new composition of matter and a process for making the same. More particularly, our invention relates to a size having a minimum of free rosin for use in connection with the manufacture of paper.

Rosin sizing has previously been made by heating a mix of rosin and the various alkali hydroxides and/or carbonates in solution form. These rosin soaps may contain 100 parts of rosin to 17 parts of soda or hydroxide. There is also present at least 20% of free rosin based upon the total rosin present. However, the present tendency in paper manufacture has been towards the use of sizings which have as low a free rosin content as possible, inasmuch as better results are possible and processing is made easier. Heretofore, it has been impossible to obtain a completely saponified low free rosin size and those sizes in commercial use which are called low free rosin sizings in reality have a free rosin content of greater than 20%, taken on the basis of total rosin.

One of the primary objects of our invention is to obtain a rosin size which has little, if any, unsaponified saponifiable rosin present.

A further object of our invention is to obtain a process by which the unsaponified saponifiable rosin content in a rosin size may be substantially eliminated.

Another object of our invention is to overcome the difficulties heretofore present in the manufacture of a low free rosin size.

Other objects and advantages of our invention will become apparent from the following description and the accompanying drawing.

The controlling elements in the manufacture of a size are temperature, pressure, ratio of alkali to rosin and time. Heretofore, in the manufacture of a rosin size, the process has been limited in the amount of free rosin which might be converted in that a mix of rosin and alkali, for example, sodium carbonate or soda ash, could not be heated above 200° F. without excessive foaming of the solution. This foaming, of course, made further processing extremely difficult, if not impossible.

Attempts have been made to obtain a quicker and more complete reaction between the alkali and the rosin by use of high pressures. Such attempts have only been partially successful and have the ever present disadvantage of requiring expensive pressure equipment and increased danger in operation.

Attempts to increase the ratio of the alkali to the rosin, of course, are limited by the requirements of the trade in regard to alkali content and the limiting feature from an economic standpoint of the relatively greater cost of the caustic soda or soda ash used. On attempting to use a high ratio of alkali to rosin the mix has been previously found to form a thick tough gel which makes further processing practically impossible. Several other limitations and disadvantages are, of course, known in the prior art.

It has been possible by means of increasing the time element, namely, the period of heating the mix, to somewhat decrease the percentage of free rosin present. However, even with prolonged heating, it has been commercially impracticable to obtain a size of lower than 20% free rosin content. Furthermore, one of the major disadvantages of such a method, outside of the increased expense in heating, has been the tendency of the mix to become gelatinous, which makes the process extremely difficult to operate and in many cases such a gelatinous mixture has formed that the equipment must be entirely disassembled in order to remove it.

Due to this tendency towards gelatinization on increasing the concentration of the constituents, it has been impossible to obtain successfully in commercial operation a mix having greater than 50% solids and a free rosin content of less than 20%. It would be seen, therefore, that all previous attempts to lower or remove the unsaponified rosin content and still obtain a size having greater than 50% solids have been unsuccessful.

We have found that by subjecting the alkali rosin mixture or solution relatively suddenly to a temperature between 200 and 500 degrees F. with a preferred temperature of 280° F., that a rosin size may be made in which the unsaponified saponifiable rosin content is substantially eliminated. This action preferably takes place when the mix is in a dispersed or diffused state. This new product may be made from either gum rosin, wood rosin, or other suitable resin. We have found that by applying such a relatively high temperature to the alkali rosin mix in a substantially sudden manner that the mix passes through the gelatinizing and/or foaming stage without the attendant disadvantages. Thus, of the four controlling elements, namely, temperature, pressure, ratio of alkali to rosin and time in the manufacture of rosin size, we have found a method for increasing the temperature above that heretofore possible and of varying the other factors without the previously attendant limiting features controlling. These controlling factors must, of course, be varied according to the composition of the components used.

We have shown in Figure 1 a diagrammatic representation of an apparatus suitable for making our product and for carrying out our process. It is to be understood, however, that our process is not limited to the apparatus shown but any means may be used by which a relatively high temperature may be suddenly applied to the rosin and alkali mix. It is possible, of course, by means of our process to obtain a dry product or one which is in a concentrated form.

Referring more particularly to the drawing, reference character 1 designates a tank or container for holding the rosin and alkali mix. Below this tank are shown the drums 2 and 3. These drums are adapted to rotate about the axis 4 and 4' and are also heated in the usual manner either internally through the axis 4 and 4' or they may be heated from underneath. A pipe 5 is connected to the bottom of the tank 1 and is controlled by the valve 6. This valve permits the mix from the tank to drop between the cylinders which rotate in opposite directions. A pool of mix may be formed between the cylinders as shown at 7. As the cylinders rotate in the directions shown by the arrows which is the preferred manner of operation, a film of mix 8 is squeezed between them and carried on their surface. This thin film is subjected to the relatively high temperature of the drum and may if desired have its moisture content substantially completely removed so that a dry product is formed. Positioned against the drums there are placed the scrapers 9 and 10 which are adapted to remove the film of dried material from the surfaces of the drums. The dried size falls into the collector or containers 11 and 12. It can be seen, therefore, that by this means a relatively high temperature may be applied to the size mix in such a manner that the mix is carried through the gelatinizing and/or foaming stages without acquiring such characteristics as have heretofore made processing difficult. The high temperature thus relatively suddenly applied to the mix dries the size mix and gives a rosin size with a substantially negligible amount of unsaponified saponifiable rosin present. The sudden heating under these conditions apparently greatly increases the tendency of the rosin to combine with the alkali and the elimination of the free rosin content is proportionally considerably greater than would have been expected based upon conclusions drawn from proportional increases in the previously used low temperatures.

We preferably use more than 10% of alkali in our mix based upon weight of rosin and thus have sufficient alkali present to eliminate the free rosin under proper conditions. The alkali referred to is commercial soda ash which contains 58% of Na₂O. This is the common strength known to the art. If caustic soda or other alkali is used, the amount required would vary accordingly to the fixed alkali content.

We have incorporated herewith certain analyses which are illustrative of the results which may be obtained with gum rosin or with wood rosin. We do not wish to be limited, however, to the use of these rosins, but may use any resin.

TABLE I

*Ordinary wet size—60% wood rosin*

|  | Per cent |
|---|---|
| Total solids | 60.43 |
| Moisture | 39.57 |
| Free rosin (by extraction) (% of total rosin) | 31.61 |
| Free rosin (by titration) (% of total rosin) | 26.5 |
| Free alkali | 0.92 |
| Total rosin (% of total size) | 56.31 |

TABLE II

*Dried size*

|  | Per cent |
|---|---|
| Solids | 99.52 |
| Moisture | 0.48 |
| Free rosin (by extraction) (% of total rosin) | 19.16 |
| Free rosin (by titration) (% of total rosin) | 14.05 |
| Free alkali | 0.74 |
| Total rosin (% of total size) | 91.00 |

TABLE III

*Ordinary wet size—60% gum rosin*

|  | Per cent |
|---|---|
| Moisture | 39.13 |
| Total solids | 60.87 |
| Free rosin (by extraction) (% of total rosin) | 29.75 |
| Free rosin (by titration) (% of total rosin) | 25.00 |
| Free alkali | 0.98 |
| Total rosin (% of total size) | 56.75 |

TABLE IV

*Dried size*

|  | Per cent |
|---|---|
| Solids | 99.76 |
| Moisture | 0.24 |
| Free rosin (by extraction) (% of total rosin) | 12.5 |
| Free rosin (by tritation) (% of total rosin) | 5.53 |
| Free alkali | 0.68 |
| Total rosin (% of total size) | 90.36 |

The sizes given in the analyses in Tables I and III have been ordinarily considered as low free rosin sizes and it is seen that taken on the basis of the total rosin, the free rosin present determined by titration in the size in Table I is 26.50% and the free rosin present in the size in Table III is 25.00%. The same type of size as shown in Table I when made by our process has a free rosin content by titration of 14.05% as shown by Table II and the free rosin present in the size made by our process similar to the size in Table III is 5.53% by titration as shown by Table IV. It is, of course, understood that the rosin percentage determined by titration is a more accurate figure than that determined by extraction inasmuch that as upon extraction a certain percentage of the saponified rosin returns to a free rosin state. Furthermore, the percentage of unsaponifiable rosin or resene present in gum rosin runs between 5 to 15 per cent. The resene present in wood rosin is normally between 12 to 15 per cent. Therefore, it is obvious that with either type of rosin the unsaponified saponifiable rosin has been practically eliminated. A size of this type has heretofore never been obtainable.

Our size having substantially no free rosin has been found to give a greatly improved paper. Also the difficulties formerly present in using a size having a substantial amount of free rosin present have been eliminated, such as coagulation and the formation of lumps of rosin, encrustations on the equipment, lack of dispersion of the colloidal rosin, and others. Our rosin size covers a greater surface and is easily used. Our size may be utilized by emulsifying with water and/or other components in any manner common to the art. A material advantage of our size is that in shipping a large saving is made due to its concentrated or dried condition. Furthermore, the use of a lighter and less expensive container is possible in shipping our product in its dried or concentrated form.

We have found that the rate of solubility of our product is considerably greater than the rate of solubility of rosin sizes heretofore attainable. For example it has previously been known in the art that a 70% wet size is less easily dissolved or emulsified than a 60% wet size of similar free rosin content. However, our size having a 95% or higher solid content is more readily soluble than the ordinary commercial 60% solid content low free rosin size. Our size may be easily dissolved with cold water, whereas in the past, it has been customary with ordinary size to use special emulsifying equipment and hot water where an emulsified size is desired.

The rapid rate of solubility of our size makes it possible in certain cases for mills to eliminate their emulsifying equipment inasmuch as we have found it is possible due to the unusually rapid rate of solubility to add our size directly to the beater.

Our size has been found to have unusually stable characteristics. That is, under adverse operating conditions in a mill the size does not break down or react so as to make processing difficult or an undesirable paper product. For example, it is often necessary to use hard water in the beater and previously sizes have tended to form undesirable insoluble rosin soaps which have little or no sizing value. Our size, on the other hand, has such stable characteristics and such a rapid rate of solubility that the formation of these disadvantageous products is largely inhibited. In this same connection, when free acid is present in the beater our size again has greater stability than sizes formerly used and has less tendency to react to form products which are less reactive with the subsequent coagulating treatment with alum.

It is to be understood that we have used the term solubility in the sense which it is commonly used in this art. It is understood, of course, that a true solution is not formed when any free rosin is present but by solubility, we have meant the emulsifibility or ease with which a dilute emulsion may be made with the product. It is also to be understood that by the term "alkali metal" which we have used in our claims, that carbonates and hydroxides of the potassium, sodium and ammonium are meant. Ammonium, of course, is commonly classified with the alkali metal group.

While we have shown only a specific modification of our process, it will be apparent to those skilled in the art that certain modifications may be made without departing from the spirit of our invention. We particularly do not wish to be limited in the operation of our process by the apparatus shown, for it is possible, of course, to carry out our process upon a single drying cylinder. It is also possible to obtain a similar result by means of a spray dryer. By means of a spray dryer we, of course, mean the type in which the material is injected and partially atomized in an atmosphere of air or other heated medium which is at a relatively high temperature. The mix therefore can be subjected to conditions substantially similar to those obtainable on the apparatus shown in our drawing, namely, a high temperature applied relatively suddenly and in such a manner that the mix is carried through and beyond the gelatinizing or jelling and/or foaming stages and the saponification immensely accelerated. We, therefore, wish to be limited only by the appended claims.

What we claim is:

1. A process for making a low free rosin size having greater than 50% solids comprising subjecting a solution of an alkali metal compound and rosin mix to drying heat above 200° F. but not more than 500° F. relatively suddenly whereby the mix is carried rapidly through and beyond gelling and foaming stages and saponification accelerated.

2. A process for making a low free rosin size comprising subjecting a mix of a solution of sodium carbonate and rosin relatively suddenly to a high drying heat above 200° F. but not above 500° F. whereby the mix is carried rapidly through and beyond gelling and foaming stages and saponification accelerated.

3. A process for making a low free rosin size comprising subjecting a mix of a solution of caustic soda and rosin relatively suddenly to a high drying heat between 200° F. and 500° F. whereby the mix is carried rapidly through and beyond gelling and foaming stages and saponification accelerated.

4. A process for making a low free rosin size comprising subjecting a film of a solution of an alkali metal compound and rosin mix suddenly and for a short period to a high drying temperature between 200° F. and 500° F. whereby the film is carried rapidly through and beyond gelling and foaming stages and saponification accelerated.

5. A process for making a low free rosin size comprising subjecting a mixture of a solution of an alkali metal compound and rosin in a diffused state suddenly to a relatively high drying heat between 200° F. and 500° F. whereby the mixture is carried rapidly through and beyond gelling and foaming stages and saponification accelerated.

6. A process for making a low free rosin size comprising subjecting a mixture of a solution of soda ash and rosin in a dispersed state suddenly to a relatively high drying heat above 200° F. but below 500° F. whereby the mixture is carried rapidly through and beyond gelling and foaming stages and saponification accelerated.

7. A process for making a rosin size comprising subjecting a spray of sodium carbonate solution and rosin to drying heat between 200° F. and 500° F. relatively suddenly whereby the mix is carried rapidly through and beyond gelling and foaming stages and saponification accelerated.

8. A process for making rosin size which comprises subjecting a spray of caustic soda solution and rosin to drying heat between 200° F. and 500° F. relatively suddenly whereby the mix is carried rapidly through and beyond gelling and foaming stages and saponification accelerated.

9. A process for making rosin size which comprises subjecting a diffused mixture of caustic soda solution and rosin to drying heat between 200° F. and 500° relatively suddenly whereby the mix is carried rapidly through and beyond gelling and foaming stages and saponification accelerated.

10. A process for making rosin size which comprises subjecting a mixture of a solution of an alkali metal compound, and rosin suddenly to a drying heat above 200° F. and below a size carbonizing temperature relatively suddenly whereby the mix is carried rapidly through and beyond gelling and foaming stages and saponification accelerated.

WILLIAM H. HARDING.
ALBERT W. MONTGOMERY.